(12) United States Patent
Kambe et al.

(10) Patent No.: US 11,136,043 B2
(45) Date of Patent: Oct. 5, 2021

(54) YAW MOMENT CONTROL APPARATUS FOR VEHICLE

(71) Applicant: TOYOTA JIDOSHA KABUSHIKI KAISHA, Toyota (JP)

(72) Inventors: Hiroki Kambe, Gotemba (JP); Yusuke Suetake, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 281 days.

(21) Appl. No.: 16/296,445

(22) Filed: Mar. 8, 2019

(65) Prior Publication Data
US 2019/0276039 A1  Sep. 12, 2019

(30) Foreign Application Priority Data
Mar. 9, 2018  (JP) .............................. JP2018-043326

(51) Int. Cl.
*B60W 40/114* (2012.01)
*B60K 17/02* (2006.01)
(Continued)

(52) U.S. Cl.
CPC ........... *B60W 40/114* (2013.01); *B60K 17/02* (2013.01); *B60K 23/08* (2013.01); *B60W 10/20* (2013.01);
(Continued)

(58) Field of Classification Search
CPC .. B60W 40/114; B60W 10/20; B60W 30/045; B60W 2720/406; B60W 2520/10; B60W 2520/28; B60W 2720/14; B60W 2720/125; B60W 2540/18; B60W 30/02; B60K 23/08; B60K 17/02
See application file for complete search history.

(56) References Cited

U.S. PATENT DOCUMENTS 6,059,067 A * 5/2000 Shibahata ............ B60W 40/114
180/338
6,064,930 A * 5/2000 Shibahata ............. B60T 8/1755
701/36

(Continued)

FOREIGN PATENT DOCUMENTS

JP  09-136555 A  5/1997
JP  2012017052 A  1/2012

(Continued)

*Primary Examiner* — Mussa A Shaawat
(74) *Attorney, Agent, or Firm* — Sughrue Mion, PLLC

(57) ABSTRACT

A yaw moment control apparatus for a vehicle which comprises a rear wheel driving torque transmission path that transmits the driving torque of a drive unit to left and right rear wheels, the path including a speed increasing device for increasing speed of the rear wheels relative to the front wheels, and clutches that change transmission capacities of driving torques to the left and right rear wheels, and a control unit for controlling fastening forces of the clutches. The control unit controls the fastening forces based on a lateral acceleration of the vehicle to impart a yaw moment by a driving torque difference between the wheels to the vehicle when traveling control of the vehicle by applying braking forces to the wheels is not being performed, and to impart no yaw moment by a driving torque difference to the vehicle when traveling control of the vehicle is being performed.

6 Claims, 11 Drawing Sheets

(51) Int. Cl.
  *B60K 23/08* (2006.01)
  *B60W 10/20* (2006.01)
  *B60W 30/045* (2012.01)
(52) U.S. Cl.
  CPC ....... *B60W 30/045* (2013.01); *B60W 2520/10* (2013.01); *B60W 2520/28* (2013.01); *B60W 2540/18* (2013.01); *B60W 2720/125* (2013.01); *B60W 2720/14* (2013.01); *B60W 2720/406* (2013.01)

(56) References Cited

U.S. PATENT DOCUMENTS

| | | | | |
|---|---|---|---|---|
| 6,205,391 | B1* | 3/2001 | Ghoneim | B60T 8/1755 |
| | | | | 180/167 |
| 6,415,215 | B1* | 7/2002 | Nishizaki | B60T 8/1755 |
| | | | | 180/167 |
| 6,885,931 | B2* | 4/2005 | Anwar | B60G 17/0162 |
| | | | | 303/146 |
| 2002/0052681 | A1* | 5/2002 | Matsuno | B60W 30/18145 |
| | | | | 701/70 |
| 2010/0203999 | A1* | 8/2010 | Yokoo | F16H 48/30 |
| | | | | 475/223 |
| 2013/0103278 | A1 | 4/2013 | Suzuki et al. | |
| 2013/0261863 | A1* | 10/2013 | Noguchi | B60W 20/00 |
| | | | | 701/22 |
| 2013/0325283 | A1* | 12/2013 | Rylander | B60W 40/114 |
| | | | | 701/82 |
| 2014/0046564 | A1* | 2/2014 | Matsuno | B60K 17/3515 |
| | | | | 701/69 |
| 2015/0096814 | A1* | 4/2015 | Maeda | B62D 11/003 |
| | | | | 180/6.28 |
| 2016/0236589 | A1* | 8/2016 | Sikand | B60K 17/145 |
| 2016/0236679 | A1* | 8/2016 | Inoue | B60W 10/20 |
| 2016/0297478 | A1* | 10/2016 | Inoue | B60W 40/08 |
| 2017/0036540 | A1 | 2/2017 | Yoshimura | |
| 2017/0088174 | A1* | 3/2017 | Inoue | B60T 8/17557 |
| 2019/0054916 | A1* | 2/2019 | Akiyama | B62D 6/04 |
| 2019/0143955 | A1* | 5/2019 | Watanabe | B60W 30/18109 |
| | | | | 701/69 |
| 2019/0168745 | A1* | 6/2019 | Hashimoto | B60W 10/18 |
| 2019/0202440 | A1* | 7/2019 | Watanabe | B60W 10/119 |
| 2019/0241176 | A1* | 8/2019 | Suzuki | B60W 30/045 |
| 2019/0263368 | A1* | 8/2019 | Takahashi | B60T 8/171 |

FOREIGN PATENT DOCUMENTS

| | | |
|---|---|---|
| JP | 2013193553 A | 9/2013 |
| JP | 2015-120501 A | 7/2015 |

* cited by examiner

YAW MOMENT CONTROL APPARATUS FOR VEHICLE

CROSS-REFERENCE TO RELATED APPLICATION

The disclosure of Japanese Patent Application No. JP2018-43326 filed on Mar. 9, 2018 is incorporated by reference in its entirety.

BACKGROUND

1. Technical Field

The present disclosure relates to a yaw moment control apparatus for a vehicle such as an automobile.

2. Description of the Related Art

In the field of vehicles such as automobiles, a yaw moment control apparatus is known that gives a yaw moment in a turn assist direction to a vehicle by increasing a driving force of a turning outer wheel relative to a turning inner wheel (torque vectoring) so as to improve turning performance of the vehicle. For example, Japanese Patent Application Laid-open Publication No. H09-136555 discloses a yaw moment control apparatus in which a driving force is distributed to front and rear wheels based on a wheel speed difference between left front and rear wheels and a wheel speed difference between right front and rear wheels, and is further distributed to the left and right rear wheels based on a wheel speed difference between the left and right rear wheels.

According to this type of yaw moment control apparatus, when a difference in wheel speed between the front wheel and the rear wheel occurs, for example, due to acceleration and deceleration of the vehicle, a yaw moment in the direction to assist the turn is given to the vehicle. Therefore, it is possible to improve running performance during turning of the vehicle accompanying acceleration/deceleration while avoiding imparting unnecessary yaw moment to the vehicle when running at a low vehicle speed.

Meanwhile, in a vehicle such as an automobile, traveling control by braking force control that improves running stability of the vehicle may be performed by applying a braking force to at least one wheel. According to the traveling control by the braking force control, the running stability of the vehicle can be improved by giving a necessary yaw moment to the vehicle and/or decelerating the vehicle.

In a vehicle equipped with a conventional yaw moment control apparatus as described in the above Laid-open Publication, when the traveling control by the braking force control is performed, a wheel speed of a wheel to which a braking force is applied decreases. For this reason, a wheel speed difference between the left front and rear wheels and/or a wheel speed difference between the right front and rear wheels become different from an original value and/or values, so that the distribution of the driving force cannot be appropriately performed. As a result, not only the turning performance of the vehicle cannot be improved due to the fact that a necessary yaw moment is not given to the vehicle, and but also, in some cases, the turning performance of the vehicle may be deteriorated due to inappropriate distribution of the driving force and a yaw moment in the direction opposite to the required yaw moment being given to the vehicle.

SUMMARY

The present disclosure provides an improved yaw moment control apparatus that prevents inappropriate yaw moment from being imparted to a vehicle due to improper allocation of driving force even when traveling control by braking force control is performed.

According to the present disclosure, a yaw moment control apparatus for a vehicle is provided which includes a drive unit, a front wheel driving torque transmission path that is configured to transmit a driving torque of the drive unit to left and right front wheels, a rear wheel driving torque transmission path that is configured to transmit the driving torque of the drive unit to left and right rear wheels and includes a speed increasing device configured to increase speeds of the rear wheels relative to those of the front wheels, and a left rear wheel clutch and a right rear wheel clutch configured to change transmission capacities of driving torques to the left and right rear wheels, respectively, by changing fastening forces, and a control unit that is configured to control the front and rear wheel driving torque transmission paths and fastening forces of the left and right rear wheel clutches.

The control unit is configured to perform a yaw moment control for imparting a yaw moment by a driving torque difference between the left and right rear wheels to the vehicle by controlling the fastening forces of the left and right rear wheel clutches based on an index value of a yaw moment required for the vehicle when traveling control of the vehicle by applying a braking force to at least one of the wheels is not being performed, and not to perform the yaw moment control for imparting a yaw moment by the driving torque difference to the vehicle when the traveling control of the vehicle is being performed.

According to the above configuration, when the traveling control of the vehicle is not being performed, a yaw moment by a driving torque difference between the left and right rear wheels is imparted to the vehicle by controlling the fastening forces of the left and right rear wheel clutches based on the index value by the yaw moment control. Further, when the traveling control of the vehicle is not being performed, since no braking force is applied to the wheels, there is no influence due to application of braking forces to the wheels. Therefore, turning performance of the vehicle can be improved by imparting a proper yaw moment to the vehicle.

On the other hand, when the traveling control of the vehicle is being performed, no yaw moment by the driving torque difference is imparted to the vehicle. Therefore, it is possible to avoid the deterioration of the turning performance of the vehicle caused by a fact that the index value of the yaw moment necessary for the vehicle is different from an original value due to the application of braking forces to the wheels by the traveling control of the vehicle and the yaw moment by the driving torque difference becomes inappropriate yaw moment.

The "traveling control of the vehicle by applying a braking force to at least one of the wheels" may be traveling control for applying a yaw moment by a braking force difference between the left and right wheels to the vehicle or traveling control for applying a yaw moment by a braking force difference between the left and right wheels to the vehicle and decelerating the vehicle.

In one aspect of the present disclosure, the control unit is configured to calculate a target value of the yaw moment to be imparted to the vehicle based on the index value, calculate target driving torques of the left and right rear wheels based on the target value, and control fastening forces of the left and right rear wheel clutches so that driving torques of the left and right rear wheels become the corresponding target driving torques.

According to the above aspect, a target value of the yaw moment to be imparted to the vehicle is calculated based on the index value, target driving torques of the left and right rear wheels are calculated based on the target value, and fastening forces of the left and right rear wheel clutches are controlled so that driving torques of the left and right rear wheels become the corresponding target driving torques. Therefore, fastening forces of the left and right rear wheel clutches can be controlled so that a yaw moment corresponding to the target value of the yaw moment is imparted to the vehicle.

In another aspect of the present disclosure, the index value may be a lateral acceleration of the vehicle, a yaw rate of the vehicle, a combination of a yaw rate of the vehicle and a vehicle speed, a target lateral acceleration of the vehicle calculated based on a steering angle and a vehicle speed, or a target yaw rate of the vehicle calculated based on a steering angle and a vehicle speed.

According to the above aspect, a target value of the yaw moment to be imparted to the vehicle can be calculated based on any one of a lateral acceleration of the vehicle, a yaw rate of the vehicle, a combination of a yaw rate of the vehicle and a vehicle speed, a target lateral acceleration of the vehicle calculated based on a steering angle and a vehicle speed, or a target yaw rate of the vehicle calculated based on a steering angle and a vehicle speed.

Further, in another aspect of the present disclosure, the control unit is configured to release the left rear wheel and right rear wheel clutches when the traveling control of the vehicle is started in a state where the yaw moment control by the driving torque difference is being performed.

According to the above aspect, the left rear wheel and right rear wheel clutches are released when the traveling control of the vehicle is started in a state where the yaw moment control by the driving torque difference is being performed, so that the yaw moment by the driving torque difference is not imparted to the vehicle. Therefore, even if the index value of the yaw moment necessary for the vehicle becomes a value different from an original value as a result of braking forces being applied to the wheels by the traveling control of the vehicle, no inappropriate yaw moment is imparted to the vehicle, which enables to effectively avoid deterioration of turning performance of the vehicle due to imparting an inappropriate yaw moment to the vehicle is being performed.

Further, in another aspect of the present disclosure, the control unit is configured to release the left and right rear wheel clutches by gradually decreasing the fastening forces of the left and right rear wheel clutches at a reduction rate that is larger as a magnitude of the control amount of the traveling control increases when the traveling control of the vehicle is started in the situation where the yaw moment control by the driving torque difference.

According to the above aspect, the left and right rear wheel clutches are released by gradually decreasing the fastening forces of the left and right rear wheel clutches at a reduction rate that is larger as a magnitude of the control amount of the traveling control increases when the traveling control of the vehicle is started in the situation where the yaw moment control by the driving torque difference is being performed. Therefore, by gradually reducing the driving torques transmitted to the left and right rear wheels, the yaw moment by the driving torque difference imparted to the vehicle can be gradually reduced to zero, which enables to reduce a change given to the turning situation of the vehicle due to sudden reduction of the yaw moment by the driving torque difference to zero. In addition, since the reduction rate is larger as the magnitude of the control amount of the traveling control increases, the larger the magnitude of the control amount of the traveling control is, the more efficiently fastening forces of the clutches can be reduced.

Further, in another aspect of the present disclosure, the control unit is configured to release the left and right rear wheel clutches by gradually decreasing the fastening forces of the left and right rear wheel clutches when it is determined that a possibility of starting the traveling control of the vehicle is high in a situation where the yaw moment control by the driving torque difference is being performed.

According to the above aspect, the left and right rear wheel clutches are released by gradually decreasing the fastening forces of the left and right rear wheel clutches when it is determined that a possibility of starting the traveling control of the vehicle is high in a situation where the yaw moment control by the driving torque difference is being performed. Therefore, since the driving torque transmitted to the left and right rear wheels can be reduced before the traveling control of the vehicle is started, even if the index value of the yaw moment necessary for the vehicle becomes a value different from an original value as a result of the braking forces being applied to the wheels by the traveling control of the vehicle, the magnitude of the yaw moment by the driving torque difference imparted to the vehicle is zero or a small value. Consequently, it is possible to reduce the possibility that the turning performance of the vehicle is deteriorated due to an inappropriate yaw moment being imparted to the vehicle.

In addition, by gradually reducing the driving torques transmitted to the left and right rear wheels, the yaw moment by the driving torque difference imparted to the vehicle can be gradually reduced to zero, so that it is possible to reduce a change in the turning situation of the vehicle caused by a fact that the yaw moment by the driving torque difference abruptly drops to zero.

It is preferable that the fastening forces of the clutches are gradually reduced so that the left and right rear wheel clutches are released at or before the start of the traveling control of the vehicle. However, fastening forces of the clutches may be gradually reduced so that the left and right rear wheel clutches are released after the start of the travelling control of the vehicle.

Other objects, other features and attendant advantages of the present disclosure will be readily understood from the description of the embodiments of the present disclosure described with reference to the following drawings.

DETAILED DESCRIPTION

Figure 1:
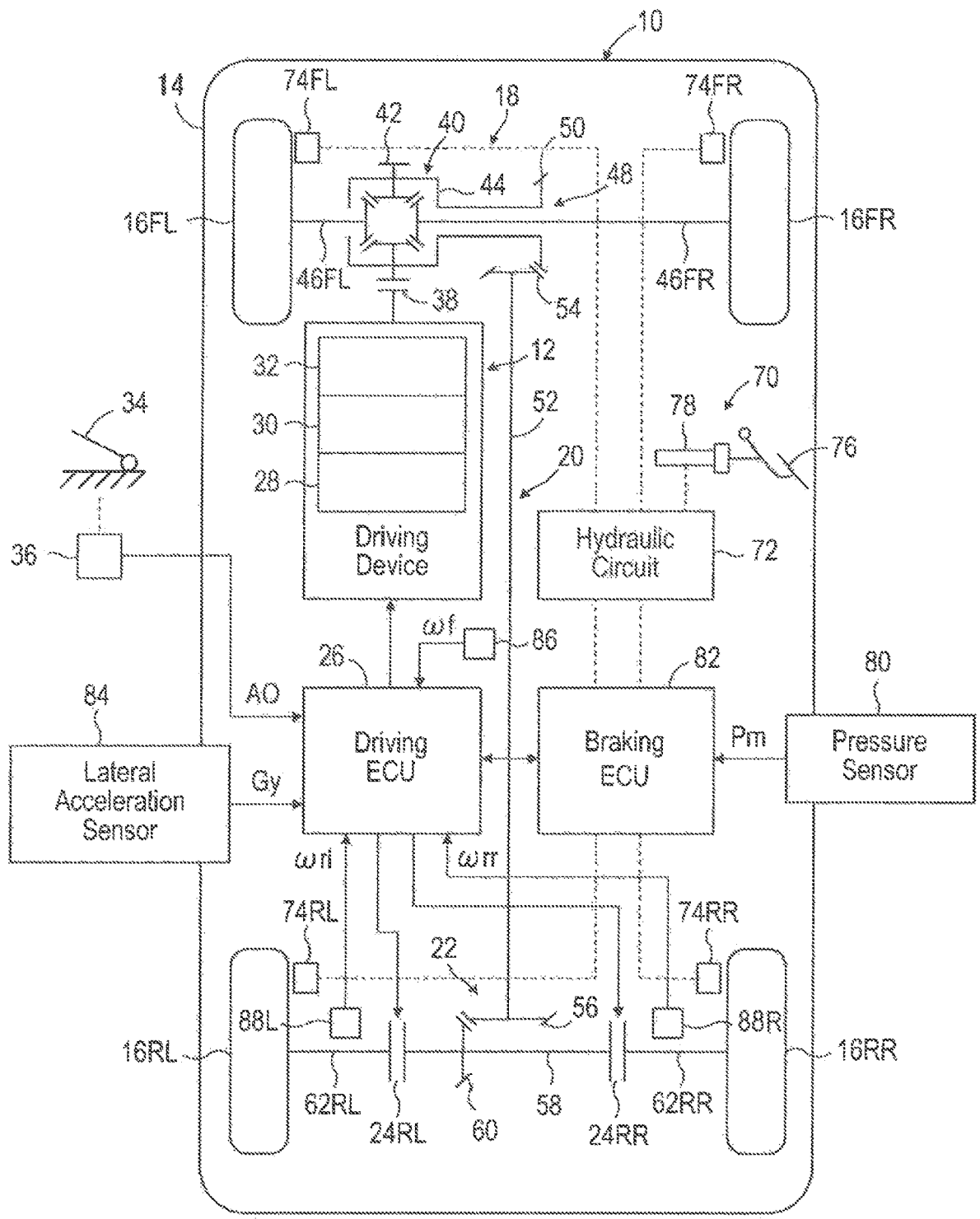
FIG. 1 is a schematic configuration diagram showing a first embodiment of a yaw moment control apparatus for a vehicle according to the present disclosure.

The present disclosure will now be described in detail with reference to the accompanying drawings.

First Embodiment

The yaw moment control apparatus 10 according to the first embodiment of the present disclosure is applied to a vehicle 14 having a driving unit 12. The yaw moment control apparatus 10 includes the driving unit 12, a front wheel driving torque transmission path 18 for transmitting a driving torque of the drive unit to left and right front wheels 16FL and 16FR, and a rear wheel driving torque transmission path 20 for transmitting a driving torque of the drive unit to the left and right rear wheels 16RL and 16RR. The rear wheel driving torque transmission path 20 includes a speed increasing device 22 for increasing the speed of the rear wheels relative to the front wheels and left rear wheel and right rear wheel clutches 24RL and 24RR that change transmission capacities for driving torque to the left rear wheel 16RL and the right rear wheel 16RR as a result of changing the fastening forces.

Further, as described in detail later, the yaw moment control apparatus 10 has a driving electronic control unit 26 as a control unit for controlling the fastening forces of the left rear wheel and right rear wheel clutches 24RL and 24RR. In the following description and FIG. 1, the "driving electronic control unit" is denoted as "driving ECU".

The driving unit 12 is a vehicle driving unit including an engine 28 as a driving torque generating device, a torque converter 30, and an automatic transmission 32, and the engine 28 may be either a gasoline engine or a diesel engine. It should be noted that the drive unit 12 may be an electric motor, and may be any vehicle drive unit known in the art, such as a combination of an engine, a motor and a transmission (hybrid system), or a combination of a fuel cell, a motor and a transmission, for example.

A signal indicative of an accelerator opening AO is input to the driving ECU 26 from an accelerator opening sensor 36 provided on an accelerator pedal 34 operated by a driver. The driving ECU 26 controls an output of the engine 28 and a gear ratio of the automatic transmission 32 based on an accelerator opening AO, a vehicle speed, and the like, thereby controlling a driving torque of the driving unit 12. Further, the output of the engine 28 and the gear ratio of the automatic transmission 32 are controlled irrespective of the accelerator opening AO, a vehicle speed and the like as necessary. The control device for controlling the output of the engine 28 and the gear ratio of the automatic transmission 32 may be a control device different from the driving ECU 26 for controlling the left rear wheel and right rear wheel clutches 24RL and 24RR.

An output gear 38 provided on an output shaft of the automatic transmission 32 meshes with a driven gear 42 of a front wheel differential device 40. A driving torque of the output shaft of the automatic transmission 32 is transmitted to a differential case 44 of the differential device 40. The driving torque transmitted to the differential case 44 is transmitted to the left and right front wheels 16FL and 16FR via the front wheel drive shafts 46FL and 46FR, respectively, by the differential device 40. Therefore, the differential device 40 and the front wheel drive shafts 46FL and 46FR cooperate with each other to form the front wheel driving torque transmission path 18.

A transfer 48 is provided adjacent to the differential device 40. The transfer 48 includes a drive gear 50 integrally connected to the differential case 44 and a driven gear 54 provided at a front end portion of a propeller shaft 52 and engaged with the drive gear 50. The driving torque transmitted to the differential case 44 is transmitted to the propeller shaft 52. A drive gear 56 is provided at the rear end portion of the propeller shaft 52, and the drive gear 56 meshes with a driven gear 60 provided on a rear wheel drive shaft 58. The left rear wheel clutch 24RL is provided between the rear wheel drive shaft 58 and a drive shaft 62RL that rotates integrally with the left rear wheel 16RL. Likewise, the right rear wheel clutch 24RR is provided between the rear wheel drive shaft 58 and a drive shaft 62RR which rotates integrally with the right rear wheel 16RR.

The driving torque transmitted to the propeller shaft 52 is transmitted to the left and right rear wheels 16RL and 16RR via the drive gear 56, the driven gear 60, the rear wheel drive shaft 58, the clutches 24RL and 24RL and the drive shafts 62RL and 62RR. Therefore, the differential device 40, the transfer 48, the drive gear 50, the driven gear 54, the propeller shaft 52, the drive gear 56, the driven gear 60, the rear wheel drive shaft 58, the clutches 24RL and 24RL and the drive shafts 62RL and 62RR cooperate with each to form the rear wheel driving torque transmission path 20.

Numbers of the teeth of at least one of the combination of the drive gear 50 and the driven gear 54 and the combination of the drive gear 56 and the driven gear 60 are set so that a rotational speed of the driven gear is higher than a rotational speed of the drive gear. Therefore, the speed increasing device 22 for increasing the speed of the rear wheels relative to the front wheels is formed by at least one of a combination of these drive gears and driven gears. A speed increasing ratio N of the speed increasing device 22 is a positive constant.

The clutches 24RL and 24RL are electromagnetic type clutches, and are configured so that their fastening forces change by controlling the control currents Irl and kr, respectively, by the driving ECU 26. Therefore, by controlling the fastening forces of the clutches 24RL and 24RL, the transmission capacities of the driving torques transmitted from the rear wheel drive shaft 58 to the left and right rear wheels 16RL and 16RR via the drive shafts 62RL and 62RR, respectively, change. As will be described in detail later, the transmission capacities of the driving torques of the clutches 24RL and 24RL increase as the control currents Irl and kr are larger. The clutches 24RL and 24RL may be hydraulic clutches as long as the transmission capacities of the driving torques can be changed.

The vehicle 14 includes a braking device 70 that independently applies braking forces to the left and right front wheels 16FL and 16FR and the left and right rear wheels 16RL and 16RR. The braking device 70 includes a hydraulic circuit 72, wheel cylinders 74FR, 74FL, 74RR and 74RL provided in the wheels 16FL to 16RL, respectively, a master cylinder 78 that feeds a brake oil in pressure in response to a driver's depression operation of a brake pedal 76. Although not shown in detail in FIG. 1, the hydraulic circuit 72 includes a reservoir, an oil pump, various valve devices, and the like, and functions as a brake actuator.

The braking device 14 further includes a pressure sensor 80, which detects a pressure in the master cylinder 78 which is driven in response to depression of the brake pedal 76 by the driver, that is, a master cylinder pressure Pm. The pressure in each of the wheel cylinders 74FL to 74RR is controlled according to the master cylinder pressure Pm in a normal state. Further, the oil pump and various valve devices are controlled as needed by an electronic control unit 82 for braking, so that the pressures in the wheel cylinders 74FL to 74RR are controlled irrespective of the amount of depression of the brake pedal 76. Therefore, the braking device 70 can independently control the braking forces of the wheels 16FL to 16RL. In the following description and in FIG. 1, the "electronic control device for braking" is denoted as "braking ECU".

Although not shown in detail in FIG. 1, both the driving ECU 26 and the braking ECU 82 include a microcomputer and a driving circuit, and exchanges necessary information mutually via CAN, for example. Each microcomputer has a general configuration in which a CPU, a ROM, a RAM, and an input/output port device are mutually connected by a bidirectional common bus.

In particular, the ROM of the microcomputer of the driving ECU 26 stores control programs corresponding to the flowcharts shown in FIGS. 2 to 4 to be described later and the map shown in FIG. 6. Further, the CPU of the driving ECU 26 executes the control program in a state where no braking operation is being performed by the driver, thereby performing yaw moment control by a driving torque difference that gives a yaw moment necessary for the vehicle 14 by a driving torque difference between the left and right rear wheels.

On the other hand, the ROM of the microcomputer of the braking ECU 82 stores a control program corresponding to the flow chart shown in FIG. 5 and the map shown in FIG. 7, which will be described later. Further, the CPU of the braking ECU 82 executes the control program under the condition where the driver does not perform the braking operation, thereby performing a yaw moment control by a braking force difference that gives a necessary yaw moment to the vehicle 14 by a braking force difference between the left and right wheels. The yaw moment control by a braking force difference is the traveling control of the vehicle by applying a braking force to at least one wheel.

A signal indicating a lateral acceleration Gy of the vehicle 14 is input from a lateral acceleration sensor 84 to the driving ECU 26. The lateral acceleration sensor 84 detects a lateral acceleration Gy by setting a lateral acceleration corresponding to the straight travel of the vehicle 14 to zero and setting lateral accelerations in the left turning direction and the right turning direction as positive and negative values, respectively. A signal indicating a lateral acceleration Gy is supplied from the driving ECU 26 to the braking ECU 82 via the CAN.

The propeller shaft 52 is provided with a wheel speed sensor 86 for outputting a signal indicating a wheel speed ωf of the left and right front wheels 16FL and 16FR by detecting the rotational speed thereof. The wheel speed sensor 86 may output a signal indicating the wheel speed ωf of the left and right front wheels 16FL and 16FR by detecting the rotational speed of the front wheel drive shaft 46FL or 46FR or the transfer 48, for example. Wheel speed sensors 88L and 88R are provided on the drive shafts 62RL and 62RR on the side of the right and left rear wheels 16RL and 16RR with respect to the clutches 24RL and 24RR, respectively and, by detecting their rotational speeds, output signals indicating wheel speeds ωrl and ωrr of the left and right rear wheels. Signals indicating the wheel speeds ωf, ωrl and ωrr are also input to the driving ECU 26.

<Yaw Moment Control by Drive Torque Difference>

Next, with reference to the flowchart shown in FIG. 2, the main routine of the yaw moment control by a driving torque difference in the first embodiment will be described. In the following description, the yaw moment control by a driving torque difference is simply referred to as "the control". The control according to the flowchart shown in FIG. 2 is repeatedly executed at predetermined time intervals when an ignition switch (not shown) is ON.

First, in step 10, a signal indicating a lateral acceleration Gy of the vehicle 14 detected by the lateral acceleration sensor 84 is read as an index value of a yaw moment necessary for the vehicle. Further, referring to the map shown by the solid line in FIG. 6 based on the lateral acceleration Gy, a target yaw moment Md by a driving force difference between the left and right rear wheels is calculated. It should be noted that the target yaw moment Md assumes a positive value when it is the yaw moment that turns the vehicle 14 in the left turning direction.

Figure 6:
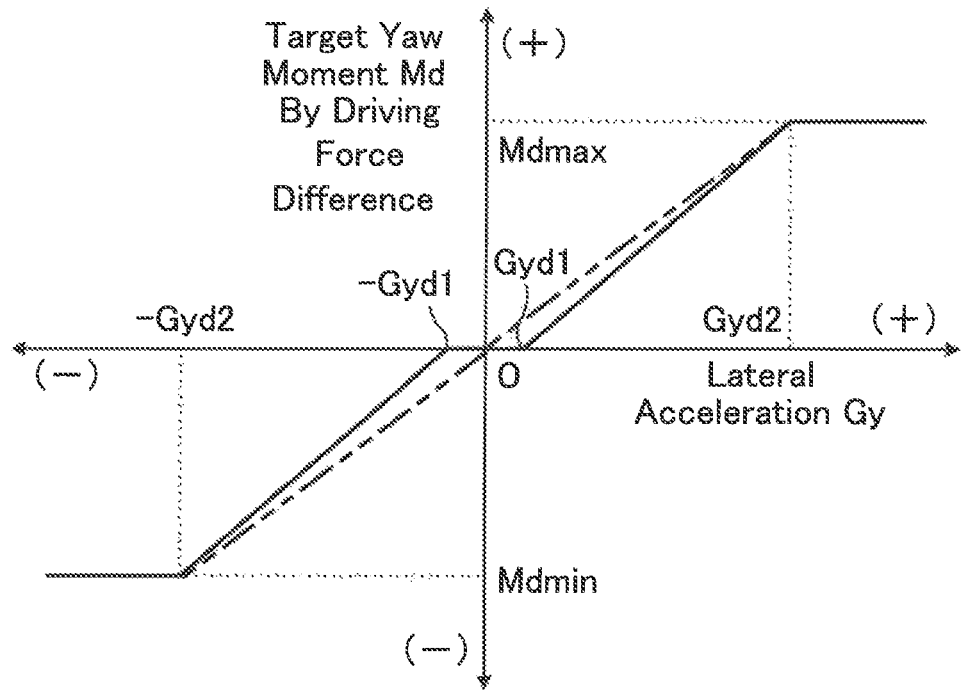
FIG. 6 is a diagram showing a map for calculating a target yaw moment Md by a driving force difference between the left and right rear wheels based on the lateral acceleration Gy of the vehicle.

As shown by the solid line in FIG. 6, when the absolute value of the lateral acceleration Gy is less than a first reference value Gyd1 (a positive constant), the target yaw moment Md is zero. When the lateral acceleration Gy is a positive value and is equal to or larger than the first reference value Gyd1 and equal to or smaller than a second reference value Gyd2 (a positive constant), the target yaw moment Md increases with a positive value as the magnitude of the lateral acceleration Gy increases. Further, when the lateral acceleration Gy exceeds the second reference value Gyd2, the target yaw moment Md assumes a constant maximum value Mdmax (a positive constant). Conversely, when the lateral acceleration Gy is a negative value equal to or smaller than a reference value −Gy1 and equal to or larger than a reference value −Gyd2, the target yaw moment Md decreases with a negative value as the absolute value of the lateral acceleration Gy increases. Further, when the lateral acceleration Gy is less than the reference value −Gyd 2, the target yaw moment Md assumes a constant minimum value Mdmin (=−Mdmax).

In the map shown by the solid line in FIG. 6, a dead zone where the target yaw moment Md becomes zero when the absolute value of the lateral acceleration Gy is less than the first reference value Gyd 1 is set. However, as shown by the two-dot chain line in FIG. 6, when the dead zone may be omitted and the target yaw moment Md may assume a positive value and a negative value when the lateral acceleration Gy is a positive value and a negative value, respectively.

In step 20, a distribution ratio Rd is set such that the larger the differences ωf−ωrl and ωf−ωrr between the wheel speed ωf of the front wheels and the wheel speeds ωrl, ωrr of the rear wheels, the greater the distribution ratio Rd of the driving torque to the rear wheels. Further, the driving torque Tf of the front wheels is estimated on the basis of the operation state of the driving unit 12, and the target driving torque Trtotal of the entire rear wheels is calculated as a product of the distribution ratio Rd and the driving torque Tf of the front wheels. Therefore, the target driving torque Trtotal is calculated such that it increases as the differences between the wheel speed ω f of the front wheel and the wheel speeds ωrl, ωrr of the rear wheels increase, and increases as the driving torque Tf of the front wheel increases.

In step 30, target driving torques Trl and Trr of the left and right rear wheels 16RL and 16RR are calculated according to the following equations (3) and (4) obtained by solving the following simultaneous equations (1) and (2). In the equations (2)-(4), Rr is an effective radius of the left and right rear wheels 16RL and 16RR, and Tv is a tread of the vehicle 14.

$$Trr+Trl=Trtotal \quad (1)$$

$$Md=(Trr-Trl)/Rr \cdot (Tv/2) \quad (2)$$

$$Trl=Trtotal/2-Md \cdot Rr/Tv \quad (3)$$

$$Trr=Trtotal/2+Md \cdot Rr/Tv \quad (4)$$

Figure 5:
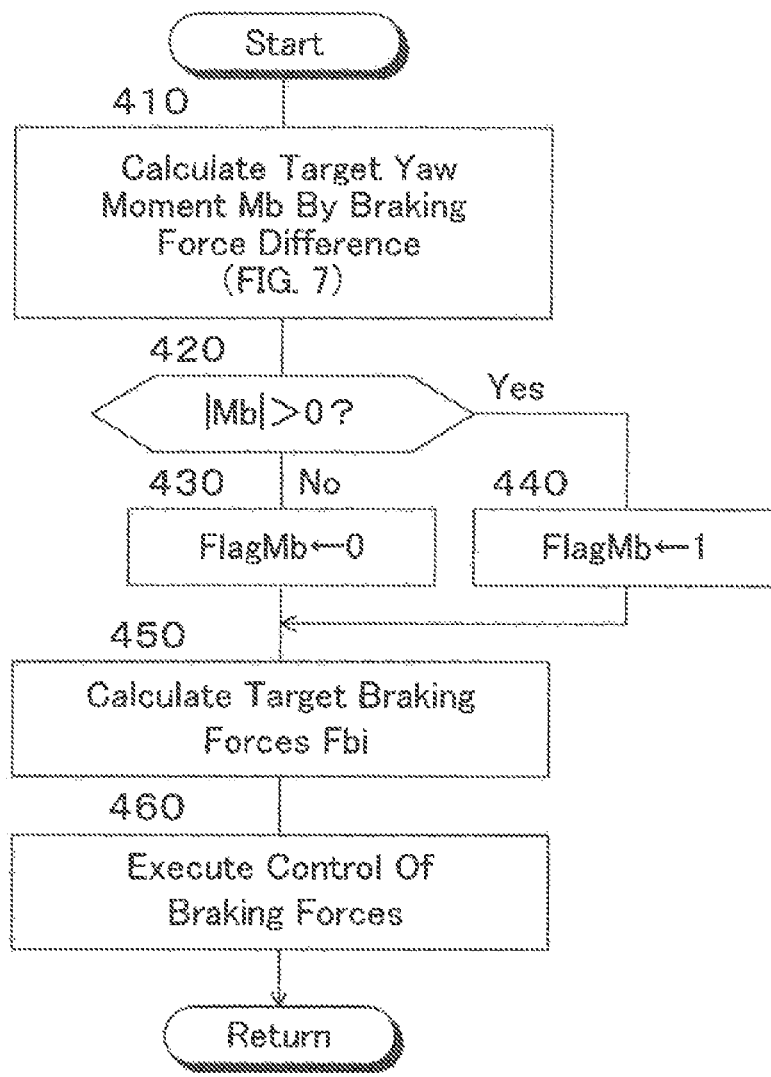
FIG. 5 is a flowchart showing a routine of yaw moment control by a braking force difference in the first embodiment.

In step 40, a determination is made as to whether or not a yaw moment by a braking force difference is being imparted to the vehicle 14 by determining whether or not the flag FlagMb set by the flowchart shown in FIG. 5 is 1. When an affirmative determination is made, the control proceeds to step 200, and when a negative determination is made, the control proceeds to step 100.

In step 100, the target driving torques Trl and Trr of the left and right rear wheels 16RL and 16RR are corrected according to a flowchart shown in FIG. 3 described later. In step 200, the target driving torques Trl and Trr of the left and right rear wheels 16RL and 16RR are corrected according to a flowchart shown in FIG. 4 described later.

In step 300, target control currents Irl and kr corresponding to the fastening forces of the left rear wheel and right rear wheel clutches 24RL and 24RR necessary for setting the driving torques of the left and right rear wheels 16RL and 16RR to the target driving torques Trl and Trr. The target control currents Irl and kr may be calculated by referring to a map not shown in the figure based on the target driving torque Trtotal of the entire rear wheels and the target driving torques Trl and Trr, for example.

In step 310, control currents supplied to the clutches 24RL and 24RR are controlled so as to be the target control currents Irl and kr, respectively. That is, the fastening forces of the left rear wheel and right rear wheel clutches 24RL and 24RR are controlled on the basis of the target control currents Irl, Irr, whereby the driving torques of the left and right rear wheels 16RL and 16RR are controlled to be the target driving torques Trl and Trr, respectively.

Next, correction of the target driving torques Trl and Trr of the left and right rear wheels 16RL and 16RR in the above-described step 100 will be described with reference to the flowchart shown in FIG. 3. When step 100 is executed for the first time, the target driving torques Trlpa and Trrpa of the left rear wheel 16RL and the right rear wheel 16RR immediately before the application of the yaw moment by the braking force difference is completed are set to the current target driving torques Trl and Trr, respectively.

In step 110, a determination is made as to whether or not the absolute value of a deviation between the target driving torque Trlpa of the left rear wheel 16RL and the current target driving torque Trl immediately before the end of the application of the yaw moment by the braking force difference is equal to or larger than a reference value Ts (a positive constant). When a negative determination is made, the immediately preceding target driving torque Trlpa is set to the present target driving torque Trl in step 120, and when an affirmative determination is made, the control proceeds to step 130.

In step 130, the average value Trlpa0 of the immediately preceding target driving torque Trlpa and the current target driving torque Trl is calculated. In step 140, the current target driving torque Trl is corrected to the average value Trlpa0, and the immediately preceding target driving torque Trlpa is set to the average value Trlpa0 in preparation for the next control cycle.

In step 150, a determination is made as to whether or not the absolute value of a deviation between the target driving torque Trrpa of the right rear wheel 16RR and the current target driving torque Trr immediately before the end of the application of the yaw moment by the braking force difference is equal to or larger than a reference value Ts. When a negative determination is made, the immediately preceding target driving torque Trrpa is set to the present target driving torque Trr in step 160, and when an affirmative determination is made, the control proceeds to step 170.

In step 170, an average value Trrpa0 of the immediately preceding target driving torque Trrpa and the current target driving torque Trr is calculated. In step 180, the current target driving torque Trr is corrected to the average value Trrpa0, and the immediately preceding target driving torque Trrpa is set to the average value Trrpa0 in preparation for the next control cycle.

In step 190, target driving torques Trlp and Trrp of the left rear wheel 16RL and the right rear wheel 16RR immediately before the application of the yaw moment by the braking force difference are set to the current target driving torques Trl and Trr in preparation for the next control cycle. The lateral acceleration Gyp of the vehicle 14 immediately before the application of the yaw moment by the braking force difference starts is set to the current lateral acceleration Gy in preparation for the next control cycle.

Next, correction of the target driving torques Trl and Trr of the left and right rear wheels 16RL and 16RR in the above-described step 200 will be described with reference to the flowchart shown in FIG. 4. When step 200 is executed for the first time, the target driving torques Trlp and Trrp of the left rear wheel 16RL and the right rear wheel 16RR immediately before the application of a yaw moment by a braking force difference are set to the current target driving torques Trl and Trr, respectively. Further, the lateral acceleration Gyp of the vehicle 14 immediately before the application of the yaw moment by the braking force difference starts is set to the current lateral acceleration Gy.

In step 205, a deviation ΔGy between the current lateral acceleration Gy of the vehicle 14 and the lateral acceleration Gyp of the vehicle immediately before the start of the application of the yaw moment by the braking force difference is calculated.

In step 210, target driving torques Trl and Trr of the left and right rear wheels 16RL and 16RR are corrected according to the following equations (5) and (6), respectively. Note that signGy in equations (5) and (6) is the sign of the lateral acceleration Gy of the vehicle. Further, the coefficient K is a positive constant coefficient in which an absolute value of a product K·ΔGy is smaller than 1, but may be varied according to an absolute value of the deviation ΔGy so that the coefficient K decreases as the absolute value of the deviation ΔGy increases.

$$Trl=Trlp(1-K\cdot\Delta Gy\cdot sigGy) \quad (5)$$

$$Trr=Trr(1-K\cdot\Delta Gy\cdot sigGy) \quad (6)$$

In step 215, a determination is made as to whether or not the corrected target driving torque Trl is a negative value. When a negative determination is made, the control proceeds to step 225, and when an affirmative determination is made, the corrected target driving torque Trl is corrected to zero in step 220, and thereafter the control proceeds to step 225.

In step 225, a determination is made as to whether or not the corrected target driving torque Trl is larger than the target driving torque Trlp that is a value just before the start of the application of the yaw moment by the braking force difference. When a negative determination is made, the control proceeds to step 235, and when an affirmative determination is made, the corrected target driving torque Trl is corrected to the target driving torque Trlp that is a value immediately before the start of the application of the yaw moment by the braking force difference in step 230, and then the control proceeds to step 235.

In step 235, a determination is made as to whether or not the corrected target driving torque Trr is a negative value. When a negative determination is made, the control proceeds to step 245, and when an affirmative determination is made, the corrected target driving torque Trr is corrected to zero in step 240, and thereafter the control proceeds to step 245.

In step 245, a determination is made as to whether the corrected target driving torque Trl is greater than the target driving torque Trrp just before the start of the application of the yaw moment by the braking force difference. When a negative determination is made, the control proceeds to step 255, and when an affirmative determination is made, the corrected target driving torque Trr is corrected to the target driving torque Trrp immediately before the start of the application of the yaw moment by the braking force difference in step 250, and then the control proceeds to step 255.

In step 255, target driving torques Trlpa and Trrpa of the left rear wheel 16RL and the right rear wheel 16RR immediately before the end of the application of the yaw moment by the braking force difference are set to the current target driving torques Trl and Trr, respectively.

<Yaw moment Control by Braking Torque Difference>

Next, the yaw moment control routine based on the braking torque difference in the first embodiment will be described with reference to the flowchart shown in FIG. 5. The control according to the flowchart shown in FIG. 5 is repeatedly executed at predetermined time intervals when the ignition switch (not shown) is ON.

Figure 7:
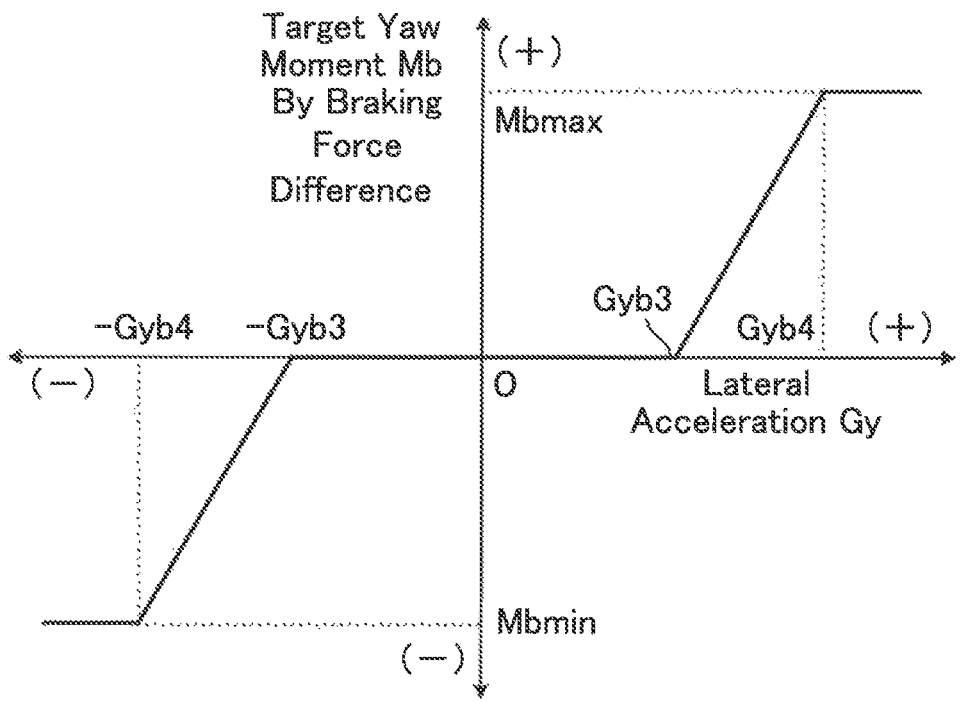
FIG. 7 is a diagram showing a map for computing a target yaw moment Mb by a braking force difference between left and right wheels based on a lateral acceleration Gy of the vehicle.

First, in step 410, a signal indicating a lateral acceleration Gy of the vehicle 14 detected by the lateral acceleration sensor 84 is read, and by referring to the map shown in FIG. 7 based on the lateral acceleration Gy, a target yaw moment Mb by a braking force difference is calculated. It should be noted that the target yaw moment Mb assumes a positive value when it is the yaw moment that turns the vehicle 14 in the left turning direction.

As shown in FIG. 7, when an absolute value of the lateral acceleration Gy is less than a third reference value Gyb3 (a positive constant larger than the first reference value Gyd1), the target yaw moment Mb is zero. When the lateral acceleration Gy is a positive value and is equal to or larger than the third reference value Gyb3 and equal to or smaller than a fourth reference value Gyb4 (a positive constant larger than the second reference value Gyd2)), as the lateral acceleration Gy is larger, the target yaw moment Mb increases with a positive value. Further, when the lateral acceleration Gy exceeds the fourth reference value Gyb 4, the target yaw moment Mb becomes a constant maximum value Mbmax (a positive constant). Conversely, when the lateral acceleration Gy is a negative value equal to or smaller than a reference value −Gy3 and equal to or larger than a reference value −Gyb4, the target yaw moment Mb decreases with a negative value as the absolute value of the lateral acceleration Gy increases. Furthermore, when the lateral acceleration Gy is less than the reference value−Gyb4, the target yaw moment Mb becomes a constant minimum value Mbmin (=−Mbmax).

In step 420, a determination is made as to whether or not the absolute value of the target yaw moment Mb is a positive value, that is, whether the yaw moment by the braking torque difference is applied to the vehicle or not. When a negative determination is made, the flag FlagMb is reset to zero in step 430, and when an affirmative determination is made, the flag FlagMb is set to 1 in step 440.

In step 450, target braking forces Fbi (i=fl, fr, rl and rr) of the left and right front wheels 16FL and 16FR and the left and right rear wheels 16RL and 16RR are calculated based on the target yaw moment Mb. For example, when the target yaw moment Mb is a positive value with Rf being a front wheel distribution ratio of the braking force (a positive constant smaller than 1), the target braking forces Fbfl and Fbrl of the left front wheel 16FL and the left rear wheel 16RL are calculated according to the following equations (7) and (8). Target braking forces Fbfr and Fbrr of the right front wheel 16 FR and the right rear wheel 16 RR are set to zero.

$$Fbfl=Rf\cdot Mb/(Tv/2) \quad (7)$$

$$Fbrr=(1-Rf)Mb/(Tv/2) \quad (8)$$

Further, when the target yaw moment Mb is a negative value, the target braking forces Fbfr and Fbrr of the right front wheel 16FR and the right rear wheel 16RR are calculated according to the following equations (9) and (10). The target braking forces Fbfl and Fbrl of the left front wheel 16FL and the left rear wheel 16RL are set to zero. Further, when the target yaw moment Mb is zero, the target braking forces of all the wheels are set to 0.

$$Fbf = Rf \cdot Mb/(Tv/2) \quad (9)$$

$$Fbr = (1-Rf)Mb/(Tv/2) \quad (10)$$

In step 460, the braking device 70 is controlled so that braking forces of the respective wheels become the target braking force Fbi, and thereby the yaw moment corresponding to the target yaw moment Mb is given to the vehicle 14.

Operation of First Embodiment

Next, the operation of the yaw moment control apparatus 10 according to the first embodiment configured as described above will be described.

In the yaw moment control (FIG. 2) by the driving torque difference, in step 10, based on a lateral acceleration Gy of the vehicle 14 as the index value of the yaw moment necessary for the vehicle, a target yaw moment Md by the driving force difference of the left and right rear wheels is calculated. In step 20, a target driving torque Trtotal of the entire rear wheels is calculated, and in step 30, based on the target yaw moment Md and the target driving torque Trtotal of the entire rear wheels, target driving torques Trl and Trr of the left and right rear wheels 16RL and 16RR are calculated.

In the yaw moment control (FIG. 5) by the braking force difference which is the traveling control of the vehicle by applying a braking force to at least one wheel, in step 410, based on a lateral acceleration Gy of the vehicle 14, a target yaw moment Mb by the braking force difference is calculated. In step 450, target braking forces Fbi of the wheels are calculated based on the target yaw moment Mb. Further, in step 460, braking forces of the wheels are controlled so as to be the target braking forces Fbi, respectively, so that the yaw moment corresponding to the target yaw moment Mb is given to the vehicle 14.

<A. When a Yaw Moment by the Braking Force Difference is not being Imparted to the Vehicle>

As can be seen from the map shown in FIG. 7, when an absolute value of a lateral acceleration Gy of the vehicle 14 is less than the third reference value Gyb3, since the target yaw moment Mb is zero, a yaw moment by the braking force difference is not given to the vehicle. Therefore, by controlling driving torques of the left and right rear wheels 16RL and 16RR to be the target driving torques Trl and Trr, respectively, a yaw moment corresponding to the target yaw moment Md by the driving force difference between the left and right rear wheels is given to the vehicle, thereby improving the turning performance of the vehicle.

Figure 2:
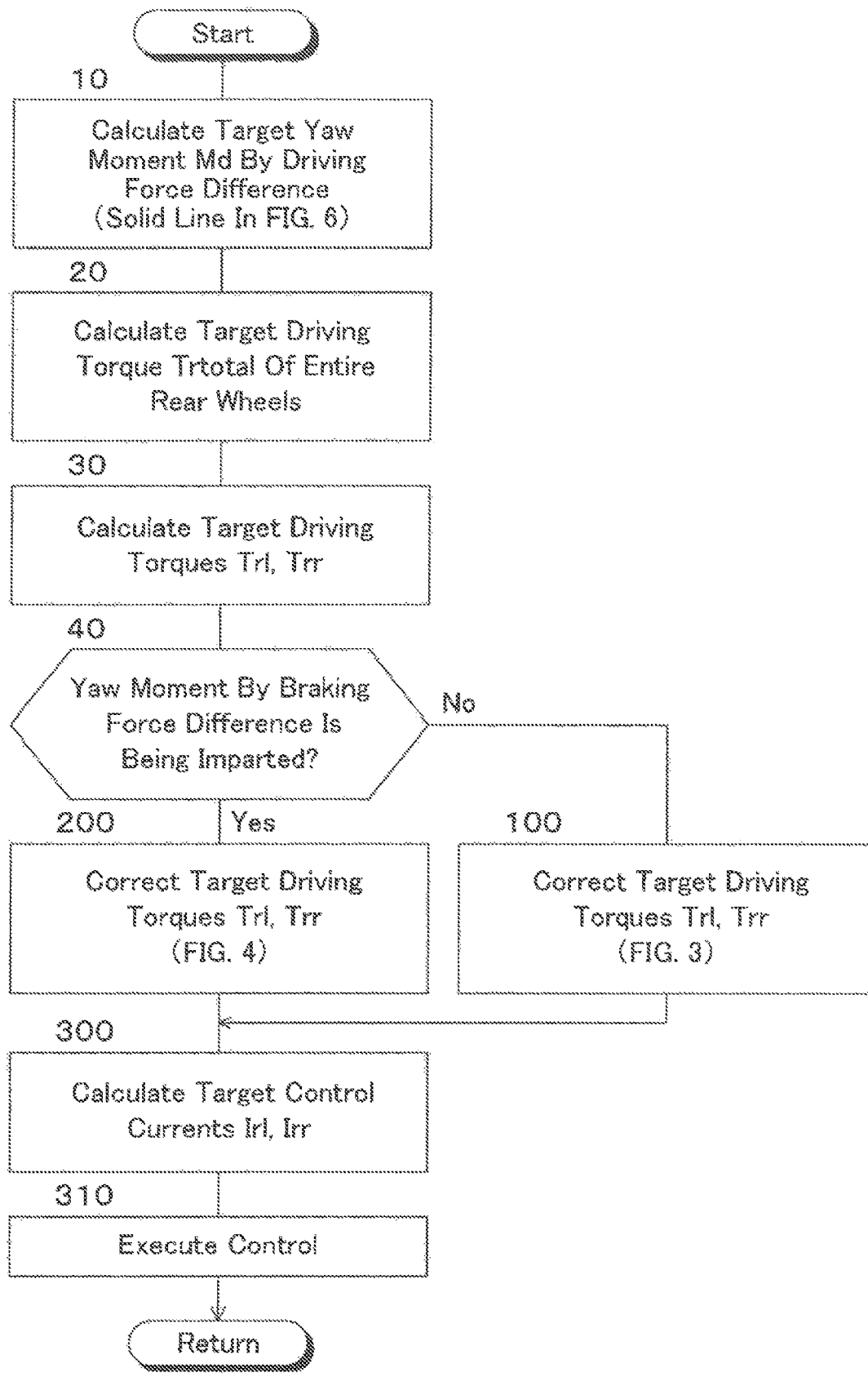
FIG. 2 is a flowchart showing a main routine of yaw moment control by a driving torque difference in the first embodiment.
Figure 3:
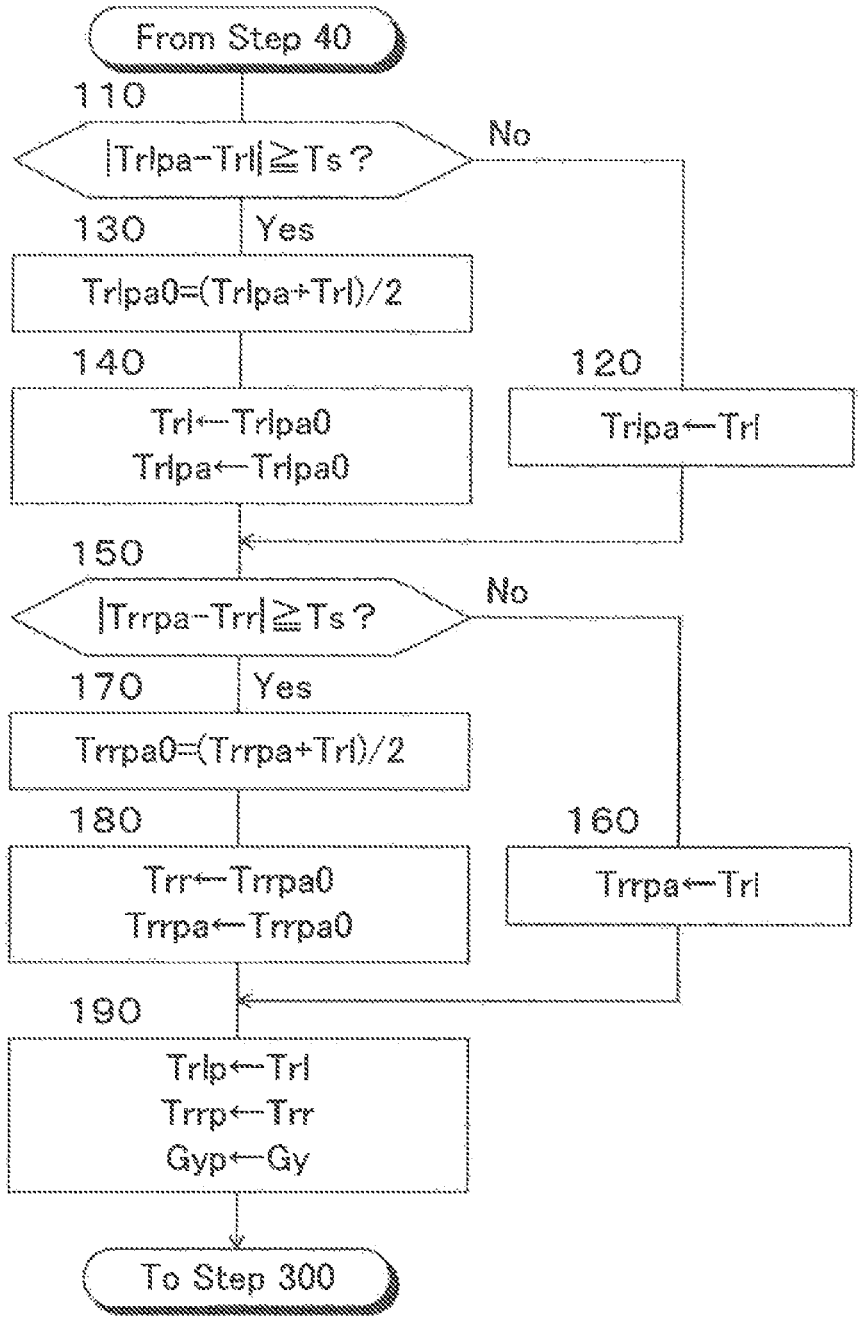
FIG. 3 is a flowchart showing a subroutine for correcting the target driving torques Trl and Trr of the left and right rear wheels executed in step 100 of the flowchart shown in FIG. 2.

Since a negative determination is made in step 40 of the flowchart shown in FIG. 2, in step 100, target driving torques Trl and Trr of the left and right rear wheels 16RL and 16RR are corrected as necessary according to the flowchart shown in FIG. 3. That is, when absolute values of the deviations between the target driving torques (Trlpa, Trrpa) of the rear wheels and the current target driving torques (Trl and Trr) immediately before the end of the application of the yaw moment by the braking force difference are less than the reference value Ts, the target driving torques are not corrected. On the other hand, when absolute values of the deviations between the target driving torques of the rear wheels and the current target driving torques immediately before the end of the application of the yaw moment by the braking force difference are equal to or larger than the reference value Ts, the target driving torques are corrected so as to gradually approach the current target driving torques.

<B. When the Yaw Moment by the Braking Force Difference is being Imparted to the Vehicle>

Figure 4:
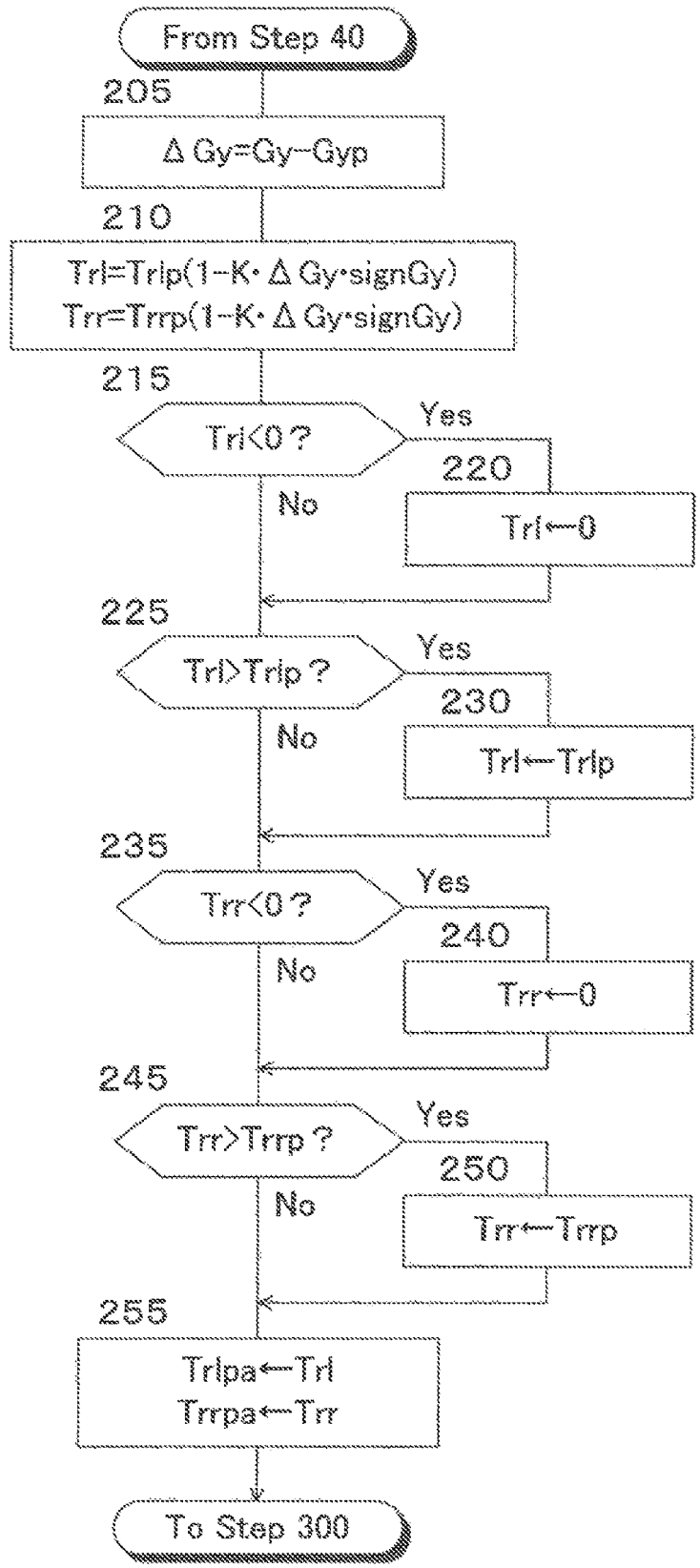
FIG. 4 is a flowchart showing a subroutine for correcting the target driving torques Trl and Trr of the left and right rear wheels executed in step 200 of the flowchart shown in FIG. 2.

Since an affirmative determination is made in step 40 of the flowchart shown in FIG. 2, target driving torques Trl and Trr of the left and right rear wheels 16RL and 16RR are corrected in step 200 according to the flowchart shown in FIG. 4. That is, in step 205, a deviation ΔGy between the current lateral acceleration Gy of the vehicle and the lateral acceleration Gyp of the vehicle immediately before the start of the application of the yaw moment by the braking force difference is calculated, and in step 210, the target driving torques Trl and Trr are corrected according to the equations (5) and (6). Therefore, in the process in which the magnitude of the lateral acceleration Gy of the vehicle increases and the yaw moment by the braking force difference increases, the target driving torques Trl and Trr are corrected so as to gradually decrease. Notably, in the process in which the magnitude of the lateral acceleration Gy of the vehicle decreases and the yaw moment by the braking force difference decreases, the target driving torques Trl and Trr are corrected so as to gradually increase.

When the target driving torques Trl and Trr corrected so as to gradually decrease in steps 215, 220 and steps 235, 240 become negative values, they are corrected to 0. Further, when the target driving torques Trl and Trr corrected so as to gradually increase in steps 225, 230 and steps 245, 250 exceed the target driving torques Trlp, Trrp, respectively, that are values just before the application of the yaw moment by the braking force difference starts are corrected to the immediately preceding target driving torques.

When the braking forces are applied to the wheels to impart the yaw moment by the braking force difference to the vehicle, the relation between the wheel speeds of the front and rear wheels becomes different from an original relationship, so the target driving torque Trtotal and the target driving torques Trl and Trr are calculated to be inappropriate values. Therefore, if the driving torques of the left and right rear wheels 16RL and 16RR are controlled so as to be the target driving torques Trl and Trr, respectively, an improper yaw moment by the driving force difference between the left and right rear wheels is imparted to the vehicle, which may degrade the turning performance of the vehicle on the contrary.

On the other hand, according to the first embodiment, when the application of the yaw moment by the braking force difference is started, the target driving torques Trl and Trr gradually decreases until they become zero, so that a yaw moment by the driving force difference between the left and right rear wheels corresponding to the target yaw moment Md is not imparted to the vehicle. Therefore, it is possible to prevent the turning performance of the vehicle from being lowered due to an inappropriate yaw moment by the driving force difference between the left and right rear wheels being imparted to the vehicle.

Further, according to the first embodiment, when the application of the yaw moment by the braking force difference is started, the target driving torques Trl and Trr gradually decrease until they become zero. Consequently, as in the second embodiment to be described later, the change in the yaw moment by the braking force difference can be made more gentle as compared to where the target driving torques Trl and Trr are instantaneously reduced to zero. Therefore, it is possible to reduce the possibility that the stability of the vehicle during turning is lowered due to a sudden change in the yaw moment imparted to the vehicle.

Furthermore, according to the first embodiment, the target driving torques Trl and Trr are corrected in accordance with the equations (5) and (6), respectively in step 210. Since the deviation ΔGy in the equations (5) and (6) corresponds to a target yaw moment Mb by the braking force difference which is a target value of the control amount of traveling control, it corresponds to the target yaw moment Mb by the braking force difference applied to the vehicle, that is, the control amount of traveling control. The reduction rate of the target driving torques Trl and Trr increases as the magnitude of the control amount of the traveling control increases, so that as the magnitude of the control amount of the traveling control increases, the fastening forces of the clutches 24RL and 24RL can be efficiently reduced.

Specific Example of Operation of the First Embodiment

Figure 10:
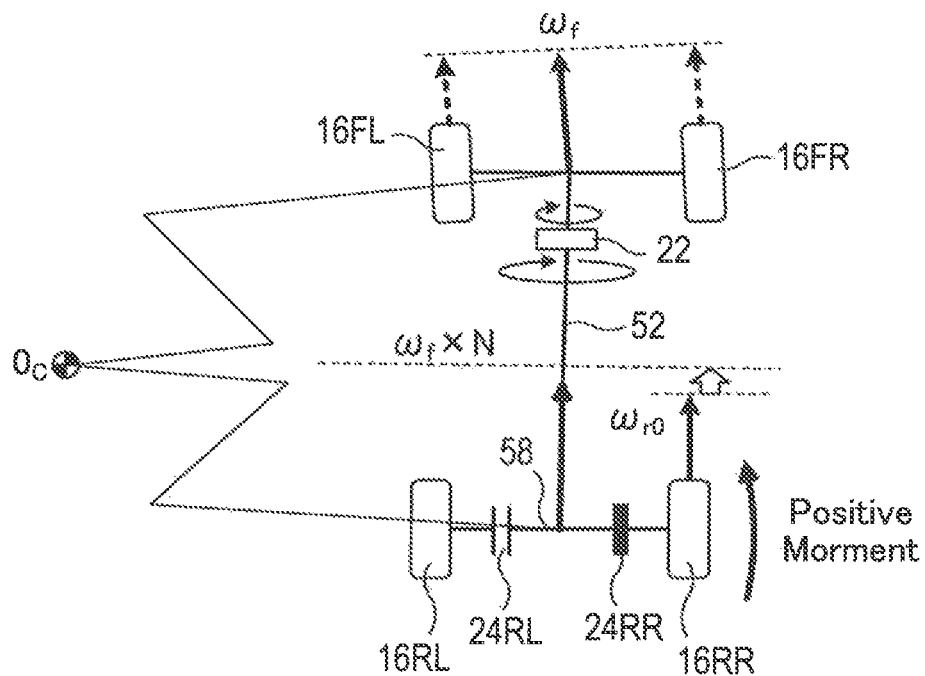
FIG. 10 is an explanatory view showing a case where the wheel speed equivalent value ωf·N of the rear wheel drive shaft is much larger than the wheel speed ωro of the turning outer rear wheel at the time of releasing the clutches.
Figure 11:
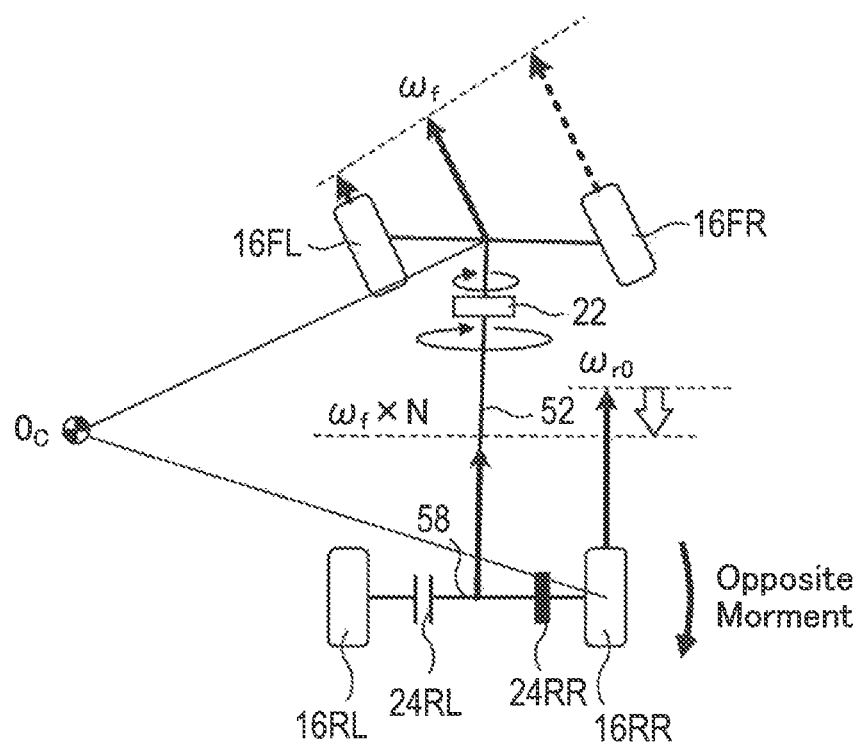
FIG. 11 is an explanatory view showing a case where the wheel speed equivalent value ωf·N of the rear wheel drive shaft is smaller than the wheel speed ωro of the turning outer rear wheel at the time of releasing the clutches.

Next, the cases where a wheel speed equivalent value ωf·N of the rear wheel drive shaft 58 is much larger than the wheel speed ωro of the turning outer rear wheel during the turning outer clutch is released (FIG. 10) and where it is smaller than the wheel speed ωro (FIG. 11) will be described in comparison with an operation of the conventional yaw moment control apparatus. In FIGS. 10 and 11, Oc indicates the turning center of the vehicle 14. FIG. 10 shows the turning situation of the vehicle with a large turning radius, and FIG. 11 shows the turning situation of the vehicle with a small turning radius.

<Case of ωf·N>>ωro (FIG. 10)>

In this case, since the wheel speed equivalent value ωf·N is larger than the wheel speed ωro of the turning outer rear wheel, by controlling the fastening force of the clutch 24RL or 24RL on the outer side of the turning, it is possible to control the driving torque of the rear outer wheel on the turning side to be the target driving torque.

Figure 12:
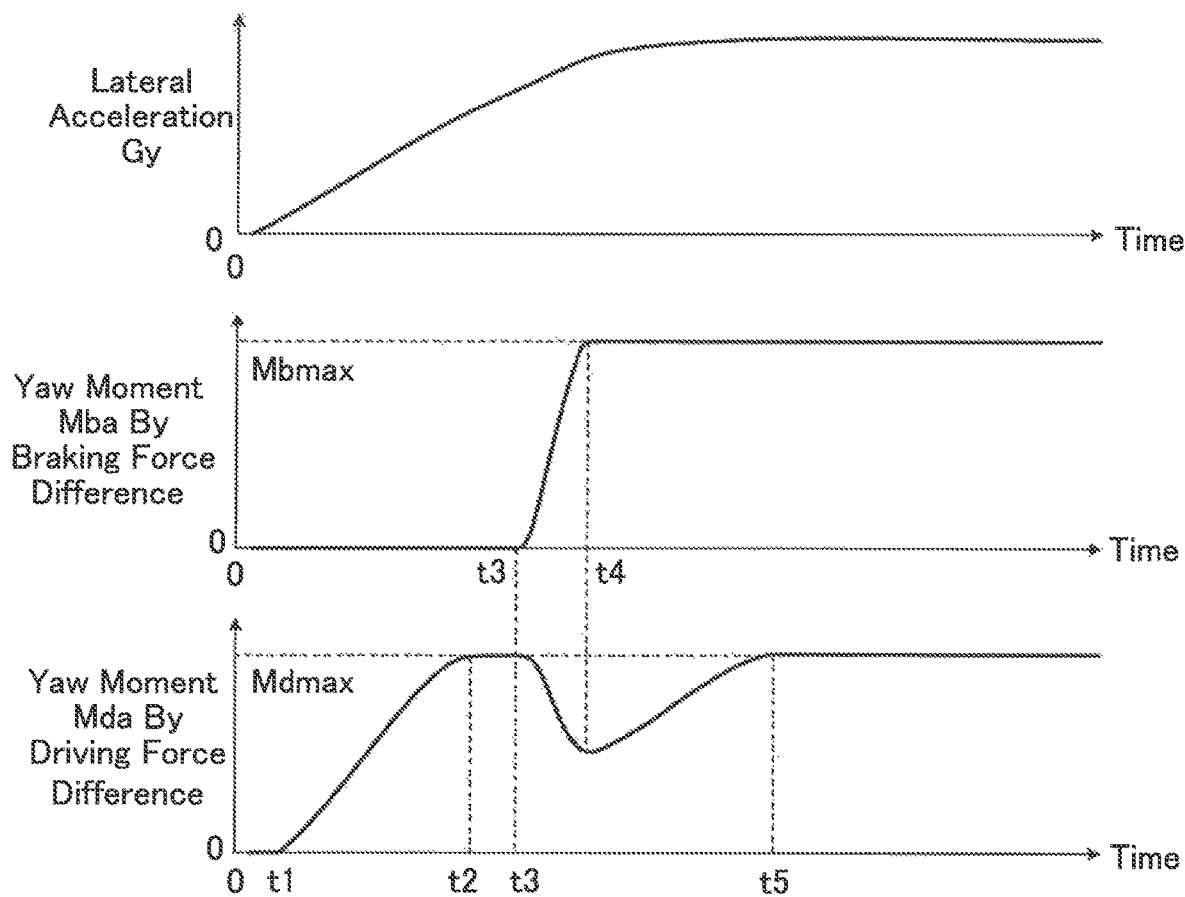
FIG. 12 is a diagram showing an example of a change in the lateral acceleration Gy of the vehicle, the yaw moment Mba by the braking force difference, and the yaw moment Mda by the driving torque difference in the conventional yaw moment control apparatus for the case of FIG. 10.

As shown in FIG. 12, it is assumed that after a lateral acceleration Gy of the vehicle gradually increases, it becomes a constant value, and the yaw moment Mda by the driving torque difference between the left and right rear wheels starts to increase from zero at a time point t1 and reaches the maximum value Mdmax at a time point t2. Further, it is assumed that the yaw moment Mba by the braking force difference begins to increase from zero at a time point t3 and reaches the maximum value Mbmax at a time point t4.

In the case of the conventional yaw moment control apparatus, the yaw moment Mda by the driving torque difference decreases as the yaw moment Mba by the braking force difference increases. Further, when the yaw moment Mba by the braking force difference reaches the maximum value Mbmax, the yaw moment Mda by the driving torque difference gradually increases until reaching the maximum value Mdmax at the time point t5. Therefore, the yaw moment imparted to the vehicle between the time point t3 and a time point t5 unnaturally changes, which may cause the stability of the vehicle at the turning tends to deteriorate.

Figure 13:
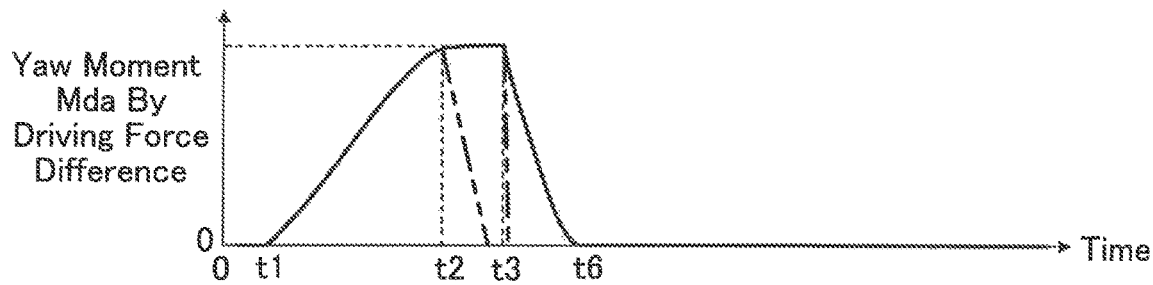
FIG. 13 is a diagram showing an example of a change in yaw moment Mda by a driving torque difference in the first to third embodiments for the case of FIG. 10.

On the other hand, according to the first embodiment, as indicated by the solid line in FIG. 13, as a result that the target driving torques Trl and Trr are gradually reduced from the time point t3 to a time point t6, for example, the yaw moment Mda by the driving torque difference is gradually reduced. Then, since the yaw moment Mda becomes zero after the time point t6, the stability of the vehicle can be prevented from lowering due to an unnatural change in the yaw moment imparted to the vehicle.

<Case of ωf·N<ωro (FIG. 11)>

In this case, since the wheel speed equivalent value ωf·N is smaller than the wheel speed ωro of the turning outer rear wheel, if the fastening force of the clutch 24RL or 24RL on the turning outer side is controlled, the wheel speed ωro decreases. Therefore, it is impossible to control the driving torque of the turning outer rear wheel to be the target driving torque. When the fastening force of the clutch on the turning outer side is controlled, a yaw moment in a direction opposite to the turning assist direction is imparted to the vehicle due to the driving torque being transmitted from the turning outer rear wheel to the drive shaft. In the intermediate case between FIG. 10 and FIG. 11, although a yaw moment in the turning assist direction can be given to the vehicle, the magnitude of the yaw moment is smaller than the magnitude of the target yaw moment Md.

Figure 14:
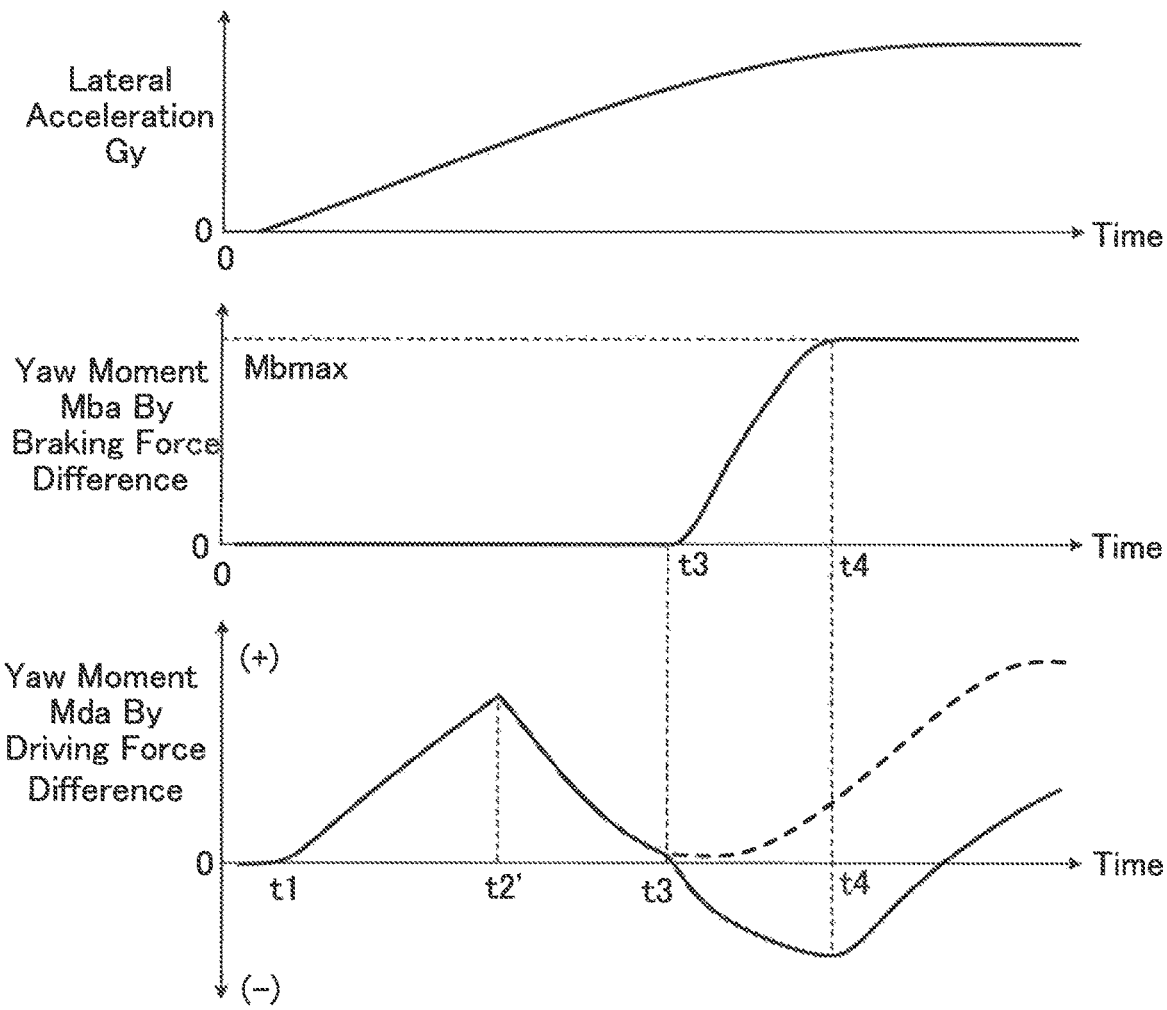
FIG. 14 is a view showing an example of a change in lateral acceleration Gy of the vehicle, a yaw moment Mba by a braking force difference, and a yaw moment Mda by a driving torque difference in a conventional yaw moment control apparatus for the case of FIG. 11.

As shown by the solid line in FIG. 14, it is assumed that the difference between the wheel speed equivalent value ωf·N and the wheel speed ωro of the rear wheel on the turning outer side becomes small at the time point t2' between the time points t1 and t3, and the yaw moment Mda by the driving torque difference begins to decrease and becomes substantially zero at the time point t3. Then, it is assumed that when the yaw moment Mba by the braking force difference does not act on the vehicle, as indicated by the broken line in FIG. 14, the yaw moment Mda gradually increases after the time point t3.

In the case of the conventional yaw moment control apparatus, as indicated by the solid line in FIG. 14, as the yaw moment Mba by the braking force difference increases after the time point t3, the yaw moment Mda by the driving torque difference further decreases and becomes a negative value. Further, when the yaw moment Mba by the braking force difference reaches the maximum value Mbmax at the time point t4, the yaw moment Mda by the driving torque difference gradually increases after the time point t4.

As a result, the turning stability of the vehicle tends to deteriorate due to an unnatural change in the yaw moment imparted to the vehicle after the time point t3. Further, after the time point t3, the yaw moment Mda by the driving torque difference becomes a negative value, causing a time during which the yaw moment in the direction opposite to the turning assist yaw moment of the vehicle acts on the vehicle. Therefore, the cornering performance of the vehicle may tend to deteriorate.

Figure 15:
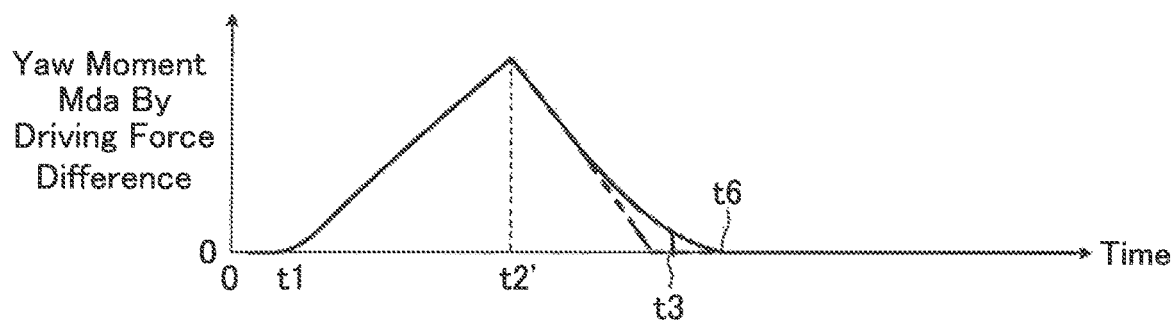
FIG. 15 is a diagram showing an example of a change in yaw moment Mda by a driving torque difference in the first to third embodiments for the case of FIG. 11.

On the other hand, according to the first embodiment, as indicated by the solid line in FIG. 15, by gradually reducing the target driving torques Trl and Trr after the time point t3, the yaw moment Mda by the driving torque difference between the left and right rear wheels is gradually reduced. Then, since the yaw moment Mda becomes zero after the time point t6, the stability of the vehicle can be prevented from lowering due to an unnatural change in the yaw moment imparted to the vehicle. It is also possible to avoid deterioration of the turning performance of the vehicle caused by the fact that the yaw moment in the direction opposite to the turn assisting yaw moment of the vehicle acts on the vehicle.

Second Embodiment

Figure 8:
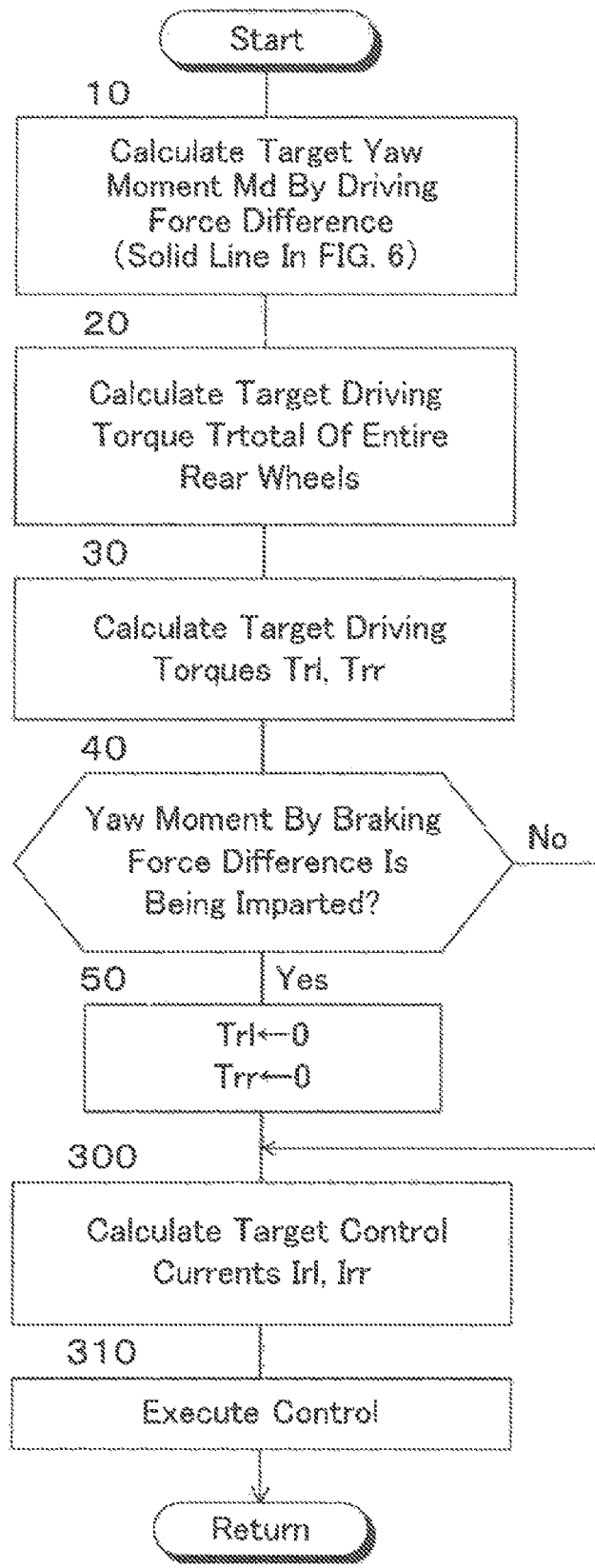
FIG. 8 is a flowchart showing a main routine of yaw moment control by a driving torque difference in a second embodiment of the yaw moment control apparatus according to the present disclosure.

FIG. 8 is a flowchart showing the main routine of the yaw moment control by the driving torque difference in the second embodiment of the yaw moment control apparatus according to the present disclosure. In FIG. 8, the same step numbers as those shown in FIG. 2 are assigned to the same steps as those shown in FIG. 2. This also applies to the third embodiments to be described later.

In the second embodiment, steps 10 to 40 and steps 300 and 310 are executed in the same manner as in the first embodiment. When a negative determination is made in step 40, that is, when the yaw moment by the braking force difference is not imparted to the vehicle 14, the control proceeds to step 300. On the other hand, when an affirmative determination is made in step 40, the target driving torques Trl and Trr of the left and right rear wheels 16RL and 16RR are set to zero in step 50, and then the control proceeds to step 300.

According to the second embodiment, when the application of the yaw moment by the braking force difference to the vehicle is started, the yaw moment by the driving torque difference between the left and right rear wheels Mda is controlled to zero by setting the target driving torques Trl and Trr to zero. Therefore, the stability of the vehicle can be prevented from lowering due to an unnatural change in the yaw moment imparted to the vehicle. It is also possible to effectively avoid deterioration of the turning performance of the vehicle due to the fact that the yaw moment in the direction opposite to the turn assisting yaw moment of the vehicle acts on the vehicle.

For example, in the cases of FIGS. 12 and 14, the yaw moment Mda by the driving torque difference between the left and right rear wheels changes as shown by the alternate long and short dashed lines in FIGS. 13 and 15, respectively, and quickly becomes zero.

Third Embodiment

Figure 9:
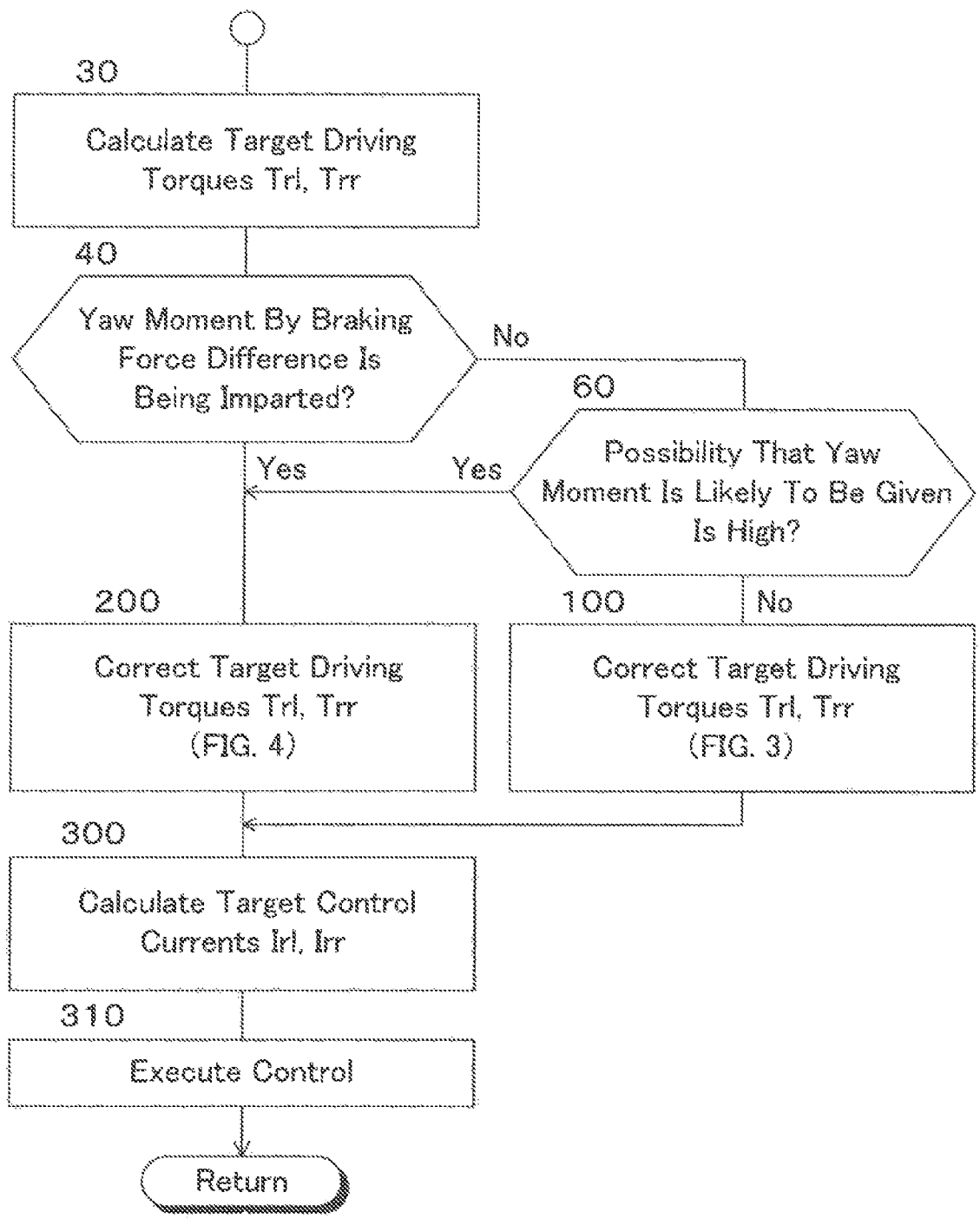
FIG. 9 is a flowchart showing a main part of a main routine of yaw moment control by a driving torque difference in a third embodiment of the yaw moment control apparatus according to the present disclosure.

FIG. 9 is a flowchart showing the main part of the main routine of the yaw moment control by the driving torque difference in the third embodiment of the yaw moment control apparatus according to the present disclosure.

In the third embodiment, steps 10 to 40 and steps 100 to 310 are executed in the same manner as in the first embodiment. When an affirmative determination is made in step 40, that is, when the yaw moment by the braking force difference is being imparted to the vehicle 14, the control proceeds to step 200 as in the first embodiment. On the other hand, when a negative determination is made in step 40, the control proceeds to step 60.

In step 60, a determination is made as to whether the possibility that the yaw moment by the braking force difference is likely to be given to the vehicle 14 is high. When an affirmative determination is made, the control proceeds to step 200, and when a negative determination is made, the control proceeds to step 100.

When a lateral acceleration Gy of the vehicle 14 is a positive value that is less than the third reference value Gyb3, if the lateral acceleration Gy is greater than or equal to a fifth reference value Gyb5 (a positive constant smaller than the third reference value Gyb3) and an increase amount dGy of the lateral acceleration per unit time is equal to or greater than a reference value dGy0 (a positive constant), the above possibility may be determined to be high. Further, when a lateral acceleration Gy of the vehicle 14 is a negative value larger than a reference value −Gyb3, if the lateral acceleration Gy is equal to or smaller than a reference value −Gyb5 and the absolute value |dGy| of an increase amount of the lateral acceleration per unit time is equal to or greater than the reference value dGy0, the above possibility may be determined to be high. The reference value dGy0 may be variably set according to the magnitude of the lateral acceleration Gy so that the reference value becomes smaller as the magnitude of the lateral acceleration Gy approaches Gyb5.

According to the third embodiment, when it is determined that the possibility of applying the yaw moment by the braking force difference to the vehicle 14 is high, the target driving torques Trl and Trr are gradually reduced, so that the yaw moment Mda by the driving torque difference between the left and right rear wheels becomes zero. Therefore, as in the first embodiment, the turning stability of the vehicle can be prevented from lowering due to an unnatural change in the yaw moment imparted to the vehicle. It is also possible to avoid deterioration of the turning performance of the vehicle caused by the fact that the yaw moment in the direction opposite to the turn assisting yaw moment of the vehicle acts on the vehicle.

For example, the yaw moment Mda by the driving torque difference between the left and right rear wheels changes as shown by two-dot chain lines in FIGS. 13 and 15 in the case of FIGS. 12 and 14, respectively, and the gradual reduction of the yaw moment is started before the application of the yaw moment by the braking force difference to the vehicle is started.

In particular, according to the third embodiment, the yaw moment Mda by the driving torque difference between the left and right rear wheels becomes zero before the application of the yaw moment by the braking force difference to the vehicle is started. Therefore, as compared to where the yaw moment Mda becomes zero after the application of the yaw moment by the braking force difference is started, it is possible to effectively avoid deterioration of the turning stability of the vehicle and degradation of the turning performance of the vehicle. The yaw moment Mda has only to be gradually reduced before the application of the yaw moment by the braking force difference is started, and the yaw moment Mda may become zero at the time when or after the application of the yaw moment by the braking force difference to the vehicle is started.

Although the present disclosure has been described in detail with reference to specific embodiments, it will be apparent to those skilled in the art that the present disclosure is not limited to the above-described embodiments, and various other embodiments are possible within the scope of the present disclosure.

For example, in the above-described embodiments, the traveling control of the vehicle is a traveling control in which braking forces are controlled such that a target yaw moment Mb by the braking force difference of the left and right wheels in the turn assisting direction is calculated based on a lateral acceleration Gy of the vehicle 14 and a yaw moment becomes the target yaw moment. However, the traveling control of the vehicle is not limited to this traveling control. For example, the traveling control of the vehicle may be arbitrary traveling control for imparting braking force to at least one wheel, including motion control for imparting braking forces to the wheels so that a yaw rate of the vehicle becomes a target yaw rate, and lane departure prevention control for imparting braking forces to the wheels so that the vehicle does not deviate from a lane.

Further, in the above-described embodiments, the index value of the yaw moment necessary for the vehicle is a lateral acceleration Gy of the vehicle, but it is not limited to the lateral acceleration. For example, the index value may be a yaw rate of the vehicle, a combination of a yaw rate of the vehicle and a vehicle speed, a target lateral acceleration of the vehicle calculated based on a steering angle and a vehicle speed, or a target yaw rate of the vehicle calculated based on a steering angle and a vehicle speed.

What is claimed is:

1. A yaw moment control apparatus for a vehicle which includes:
   a single drive unit, a front wheel driving torque transmission path that is configured to transmit a driving torque of the drive unit to left and right front wheels and includes a front wheel differential device, a rear wheel driving torque transmission path that is configured to transmit the driving torque of the drive unit to left and right rear wheels and includes a propeller shaft, a rear wheel drive shaft, first drive and driven gears provided between the front wheel differential device and the propeller shaft, second drive and driven gears provided between the propeller shaft and the rear wheel drive shaft, and a left rear wheel clutch and a right rear wheel clutch provided between the rear wheel drive shaft and the left and right rear wheels, respectively and configured to change transmission capacities of driving torques to the left and right rear wheels, respectively, by changing fastening forces, and at least one of the first and second drive and driven gears being configured to function as a speed increasing device configured to increase speeds of the rear wheels relative to those of the front wheels, and a control unit that is configured to control the fastening forces of the left and right rear wheel clutches, wherein the control unit is configured to perform a yaw moment control for imparting a yaw moment by a driving torque difference between the left and right rear wheels to the vehicle by controlling the fastening forces of the left and right rear wheel clutches based on an index value of a yaw moment required for the vehicle when traveling control of the vehicle by applying a braking force to at least one of the wheels is not being performed, and not to perform the yaw moment control for imparting a yaw moment by the driving torque difference to the vehicle when the traveling control of the vehicle is being performed.

2. The yaw moment control apparatus for a vehicle according to claim 1, wherein the control unit is configured to calculate a target value of the yaw moment to be imparted to the vehicle based on the index value, calculate target driving torques of the left and right rear wheels based on the target value, and control fastening forces of the left and right rear wheel clutches so that driving torques of the left and right rear wheels become the corresponding target driving torques.

3. The yaw moment control apparatus for a vehicle according to claim 2, wherein the index value may be a lateral acceleration of the vehicle, a yaw rate of the vehicle, a combination of a yaw rate of the vehicle and a vehicle speed, a target lateral acceleration of the vehicle calculated based on a steering angle and a vehicle speed, or a target yaw rate of the vehicle calculated based on a steering angle and a vehicle speed.

4. The yaw moment control apparatus for a vehicle according to claim 1, wherein the control unit is configured to release the left and right rear wheel clutches when the traveling control of the vehicle is started in a state where the yaw moment control by the driving torque difference is being performed.

5. The yaw moment control apparatus for a vehicle according to claim 1, wherein the control unit is configured to release the left and right rear wheel clutches by gradually decreasing the fastening forces of the left and right rear wheel clutches at a reduction rate that is larger as a magnitude of the control amount of the traveling control increases when the traveling control of the vehicle is started in the situation where the yaw moment control by the driving torque difference is being performed.

6. The yaw moment control apparatus for a vehicle according to claim 1, wherein the control unit is configured to release the left and right rear wheel clutches by gradually decreasing the fastening forces of the left and right rear wheel clutches when it is determined that a possibility of starting the traveling control of the vehicle is high in a situation where the yaw moment control by the driving torque difference is being performed.

\* \* \* \* \*